United States Patent [19]

Utenick

[11] 4,429,262

[45] Jan. 31, 1984

[54] THREE PHASE MOTOR OSCILLATORY SERVO CONTROL

[75] Inventor: Michael R. Utenick, Englewood, Colo.

[73] Assignee: Technicare Corporation, Solon, Ohio

[21] Appl. No.: 186,928

[22] Filed: Sep. 12, 1980

[51] Int. Cl.³ .................... H02K 29/00; H02K 29/02
[52] U.S. Cl. .................................. 318/254; 318/627
[58] Field of Search ............ 318/627, 254, 121, 122, 318/127, 129, 130, 132–134, 463

[56] References Cited

U.S. PATENT DOCUMENTS

| | | | |
|---|---|---|---|
| 3,665,282 | 5/1972 | Skehan | 318/627 |
| 3,737,751 | 6/1973 | Lima | 318/463 |
| 4,025,837 | 5/1977 | Meier et al. | 318/685 |
| 4,027,215 | 5/1977 | Knight et al. | 318/254 |
| 4,228,396 | 10/1980 | Palombo et al. | 318/463 |
| 4,270,074 | 5/1981 | Duckworth et al. | 318/254 |

*Primary Examiner*—David Smith, Jr.
*Assistant Examiner*—E. S. Indyk

[57] ABSTRACT

The rotor of a brushless DC motor is monitored continuously, and successive positions thereof are encoded in the form of digital counts. The count is continuously converted to analog form, and is compared with an analog reference signal, to determine the position error, and hence the speed error, or the motor relative to the desired constant speed reference. The error differential is suitably converted back to digital form to provide the motor power/drive amplifiers with sufficient electrical drive for the degree of correction which must be made. The digital position count from the counter is also coupled to a memory, which maintains in storage representations of position, and torque characteristics of the motor. Hence, based on these stored quantities and upon the actual motor parameters as exemplified by the present position, the memory issues control signals, that is timing and directional commands for correction of the motor speed.

4 Claims, 3 Drawing Figures

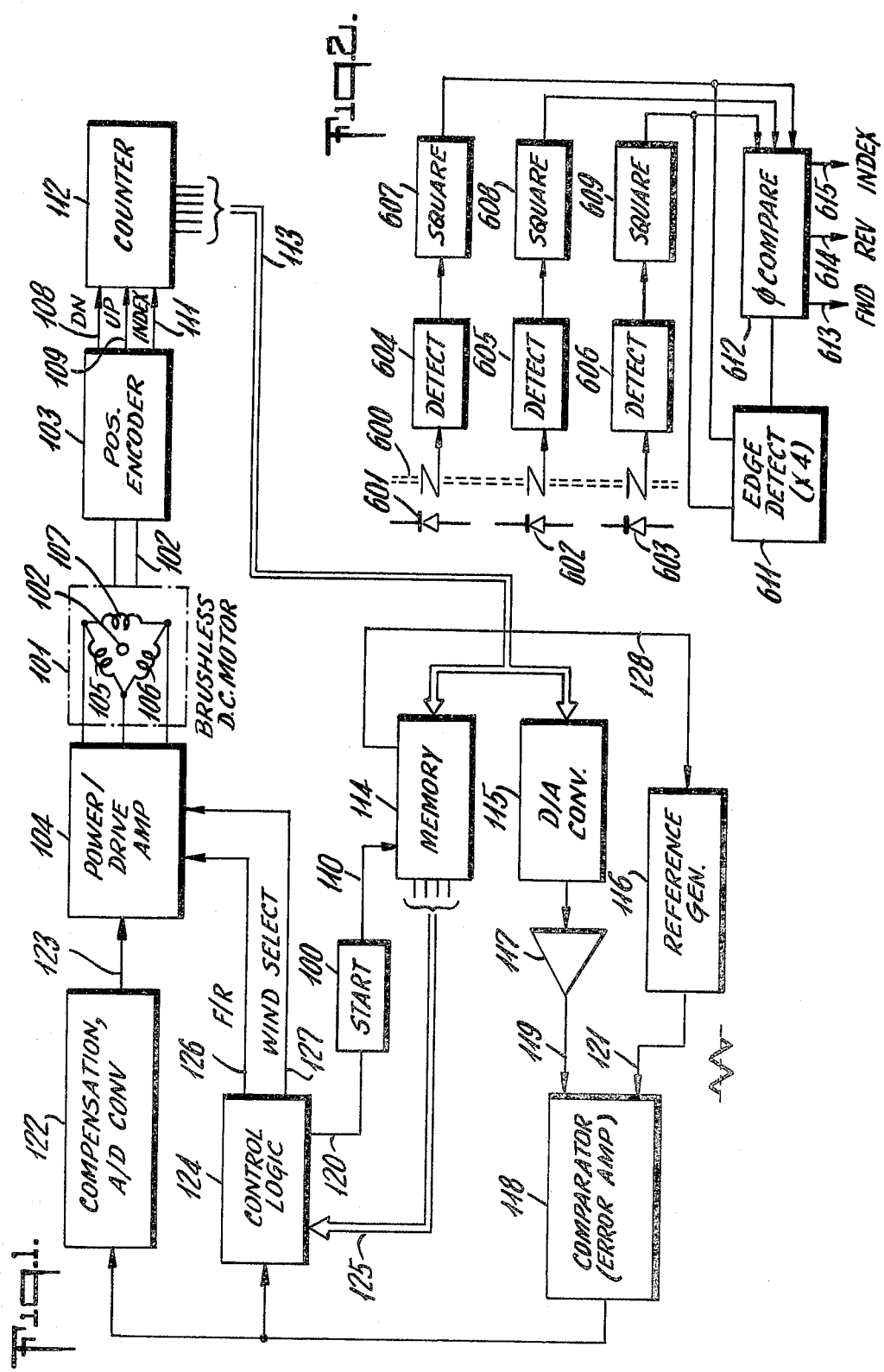

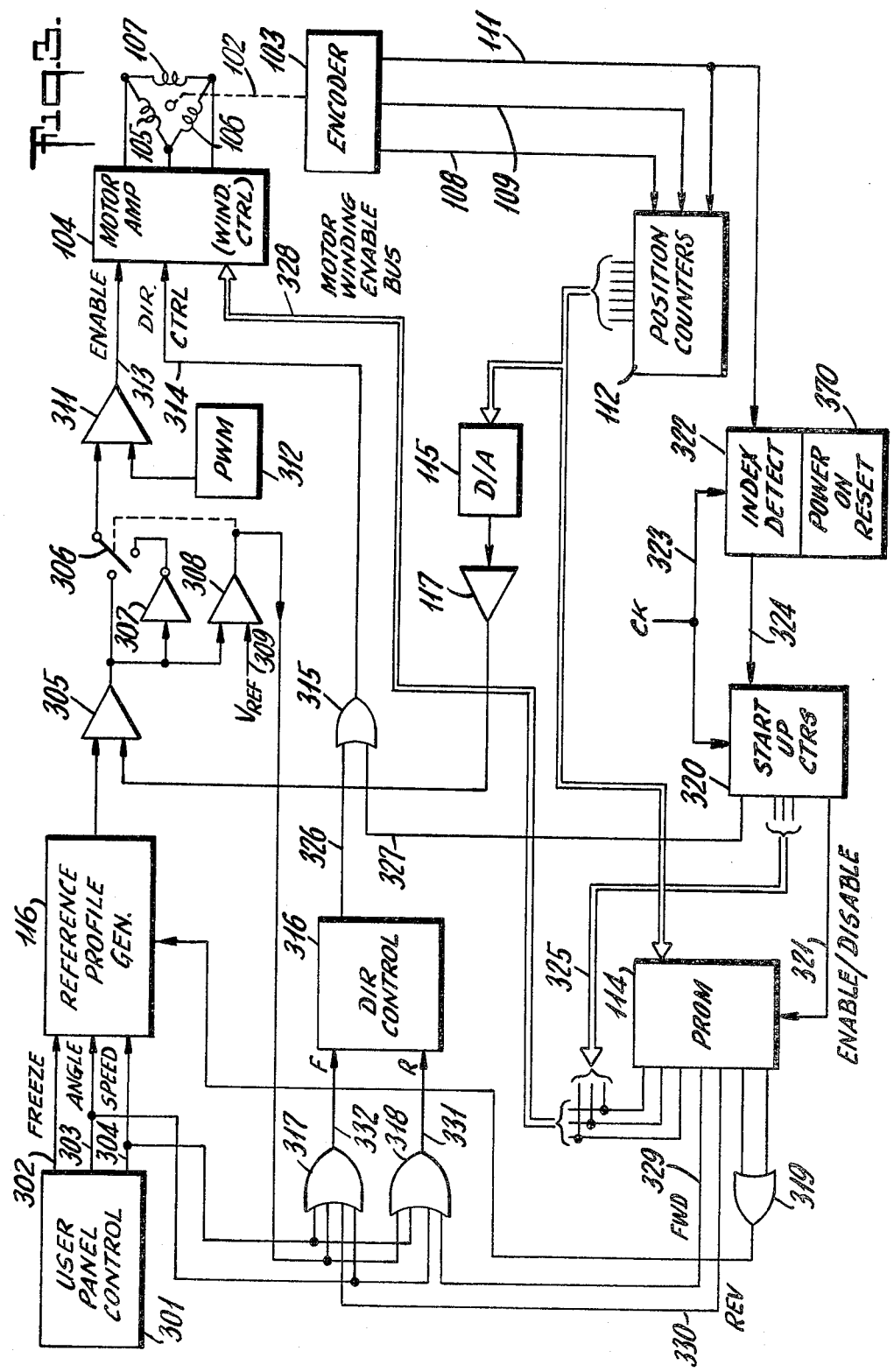

THREE PHASE MOTOR OSCILLATORY SERVO CONTROL

FIELD OF THE INVENTION

This invention relates to the generation and control of oscillatory motion of select components, and more particularly to the establishment and maintenance of substantially constant speed oscillatory motion of an ultrasound scanning element.

BACKGROUND OF THE INVENTION

An increasingly useful, and therefore popular class of ultrasound diagnostic imaging system employs a so-called mechanical sector scanner head. These systems, designed for compactness and easy manipulation, feature a scanning mechanism which is placed in close contact to the skin of the subject by means of coupling gel and oscillates to-and-fro to generate an expanding sector shaped image field in the patient. Thus, for discrete radially extending scan lines in the sector, a transducer fires a sonic pulse into the patient, and an acoustic echo train is returned to and sensed by the transducer. Scanning is achieved in a variety of ways, for example by employing mirrors which oscillate through an angle which establishes the size of the sector. An example of such a system is disclosed and claimed in copending U.S. application Ser. No. 178,482 (UNI-11) of C. Hottinger, entitled "Ultrasound Imaging System Employing Real Time Mechanical Sector Scanner", assigned to the assignee hereof.

It is an object of the present invention to provide oscillatory motive power, and the requisite control mechanisms therefor to establish substantially constant speed oscillatory motion for a scanning component, such as a mirror, in mechanical sector scanner ultrasound systems. Oscillating the mirror at a constant velocity maximizes the number of pulse/echoes that can be transmitted in one field and thus maximizes the number of fields per second displayed on the video monitor.

It is an associated object to provide such apparatus which is of relatively minimum size, without compromise to controllability or reliability.

At least two types of motor/servo systems seem appropriate to meet the objects of the principles of the present invention. Brushless DC motors are quite compact, possess considerable reliability, and eliminate noise and fatigue problems associated with commutating brushes. Brushless DC motors have conventionally been deemed quite difficult to control, however, and largely for this reason have not been extensively utilized in mechanical sector scanner designs. Indeed, traditional approaches to control of brushless DC motors have not only been functionally marginal, but furthermore utilize control approaches which invoke size limitations which the brushless DC motors are introduced to avoid. For example, Hall effect devices and photo transistors have been utilized to determine the peak torque points for the brushless motors, but both approaches have been found wanting due to functional shortcomings and to excessive bulk for the compactness requirements of mechanical sector scanners. Further, should the number of poles in the motor be changed, magnets for the Hall effect sensors would have to be completely redesigned, or the photo transistors employed in the optical control approach would have to be realigned. Moreover, utilization of three phase brushless motors entails considerable difficulty in the detection of overspeed, and the corresponding utilization of the motor to act as a decelerating brake.

In short, although on casual observation brushless DC motors appear excellent candidates for ultrasound mechanical sector scanner head applications, extensive controllability problems have led most designers instead to utilize brush type motors. As previously stated, although these motors are quite readily controlled for the contemplated applications, they entail the severe disadvantages of brush wear (and the need for periodic replacement thereof), and the generation of excessive noise due to the mechanical characteristics of the brushes.

It is an object of the present invention to provide motive and control apparatus for ultrasound mechanical sector scan heads. It is an allied object to provide compact, convenient servo control apparatus which provides stable, reliable control, and which allows the motor to be utilized as a decelerating brake in overspeed situations.

It is a further object of the principles of the present invention to utilize brushless DC motors but to avoid control rationale based on the likes of Hall effect systems, or optical/photo transistor designs.

SUMMARY OF THE PRESENT INVENTION

The principles of the present invention are premised upon utilization of a brushless DC torque motor to oscillate an ultrasound scanning element, such as a mirror, at substantially constant speeds, in conjunction with a digital servo control loop. By employing a digital memory which monitors the position and torque, those quantities are varied based upon stored information corresponding to the speed, position, and torque characeristics of the motor.

In a preferred embodiment, the rotor of a brushless DC motor is monitored continuously, and successive positions thereof are encoded in the form of digital counts. The count is continuously converted to analog form, and is compared with an analog reference signal, to determine the position error, and hence the speed error, of the motor relative to the desired constant speed reference. The error differential is suitably converted back to digital form to provide the motor power/drive amplifiers with sufficient electrical drive for the degree of correction which must be made. The digital position count from the counter is also coupled to a memory, which maintains in storage representations of position, and torque characteristics of the motor. Hence, based on these stored quantities and upon the actual motor parameters as exemplified by the present position, the memory issues control signals, that is timing and directional commands for correction of the motor speed.

DESCRIPTION OF THE DRAWINGS

FIG. 1 shows a schematic block diagram of a preferred embodiment of the principles of the present invention.

FIG. 2 shows schematic diagrams of greater detail with respect to the embodiment of FIG. 1.

FIG. 3 shows further detail concerning an optical encoding scheme suitable for application in accordance with the principles of the present invention.

BEST MODE FOR CARRYING OUT THE INVENTION

Referring first to FIG. 1, there is shown in block diagrammatic form a preferred embodiment of the principles of the present invention. The system of FIG. 1 operates about a brushless DC motor 101, which includes a power/drive amplifier 104 providing power to a trio of phases or windings 105, 106, and 107. In conventional fashion, the power/drive amplifier 104 drives the motor windings 105, 106, and 107 by switching power transistors which selectively energize the respective windings 105, 106, and 107. The switching of the power transistors of amplifier 104, as is described extensively hereinafter, is based upon directional, amplitude, and on/off energizing control signals. The motor shaft 102 affixed to the rotor (not shown) is connected to a position encoder 103, whereby the encoder 103 senses the position of the shaft 102 as it rotates under motive force of the windings 105, 106, and 107. In a preferred embodiment, the motor 101 is embodied as a Sierracin/Magnedyne model 566-05 brushless DC torque motor.

The position encoder 103, in conjunction with a counter/accumulator 112, notes the position of the shaft 102, and produces, at the output of counter 112, a binary encoded representation of the position of the shaft 102. As disclosed in greater detail hereinafter in conjunction with FIG. 3, the position encoder 103 comprises an optical wheel type encoder directly affixed to the shaft 102, and associated signal processing and logic circuits which produce a pulse at line 108 for each nominal rotational increment in one direction, a pulse at line 109 for each nominal rotational increment in the opposite direction, and a pulse on line 111 each time a datum or "index" point of the encoder wheel is passed. Advantageously, the index signal on line 111 corresponds to a midway point in a sector of oscillation of shaft 102, and also preferably, each pulse on the index line 111 presets the counter 112 to a predetermined reference count. In any event, at all times the encoded output of the counter 112 represents the position of the rotor of the brushless DC motor 101. Likewise, changes in that count, and the rate of change in that count, reflect velocity and velocity changes from the motor 101.

The output count of counter 112 is coupled via line 113 both to a memory 114, and to a digital to analog converter 115. The memory 114 provides important control functions in accordance with the principles of the present invention, and is described in greater detail hereinafter. The digital to analog converter 115, together with signal conditioning amplifier 117, provides an analog position reference signal, at line 119, which when compared with a reference signal, forms the basis for control. That is, a reference generator 116 provides a ramp type positional reference signal, which implies a constant velocity reference signal, at line 121, such as that shown in the figure, against which the actual position signal on line 119 is compared. This comparison function, actually a subtraction operation, is performed by a comparator 118, which produces at its output an analog signal whose amplitude represents the disparity of the motor position and speed from the reference motor position. A small positional error implies a constant velocity which is the desired characteristic of the servo system.

The error signal from comparator 118 is coupled to a compensation amplifier and analog to digital converter 122. The compensation aspects of amplifier 122 are conventional servomechanism features, maintaining system bandwidth, phase margin, and the like parameters within predetermined stability criteria. These criteria in turn are developed, in accordance with the abilities of those of ordinary skill in the art, based upon the operational characteristics of the motor being utilized. The compensated analog error signal is reconverted from analog to digital form, for example utilizing pulse width modulation, thereby providing at line 123 an encoded correction signal, which, subject to the enabling and directional constraints also provided via lines 126 and 127, dictate correction which must be made for the motor 101 to operate at the desired constant velocity.

For the constant velocity oscillatory operation, a triangular position profile is required, with the motor position starting, for example, at minus 45° from the center and moving at constant velocity following the positive slope of a position profile. Once the motor reaches plus 45° from the center, the motor reverses direction and follows the negative position slope of the position profile. Hence, the output of the reference generator 116 is seen to provide such a profile for comparison with the actual position of the motor.

It will be appreciated that motor start up conditions are distinct from the free running control situation, and in order to represent this condition, a "start" function 100 is shown coupled to the control logic 124 and to the memory 110. Essentially, during the start up procedure, operation of the memory 114 is inhibited, and specific aspects of the control logic 124 are employed (i.e. a predetermined output sequence of energizing the coils 105, 106, and 107) in order to insure that the motor will always start rotating in a predetermined direction, and will not stall. The motor will continue to rotate in the predetermined direction until the index reference point is found. Previous to finding the index reference point, the positional counters contain arbitrary information which does not reflect the true motor shaft position.

Assuming completion of a suitable start up routine, memory 114 ceases to be inhibited via line 110, and the start up aspects of control logic 124 are disabled. In such normal operation, the memory 114 monitors the encoded shaft position via counter 112, and on that basis, produces signals via line 125 which indicate which of the windings 105, 106, and 107 should be energized, at the particular position of the rotor, so the correction dictated at line 123 might be achieved utilizing relatively maximum motor torque. Hence, in essence, the memory 114 embodies in discrete digital terms the speed/torque position characteristics of the motor 101, mapping the peak torque situations for the motor 101 against various positional possibilities for the rotor. To choose an oversimplified example, it might be that the memory 114 would issue a signal to energize phase 107 if the motor position is within 30° of an index point, but to energize a different phase when the position of the rotor is between 30 and 60 degrees away from the index.

The control logic 124 receives the analog error signal from comparator 118 and the torque/phase selection information from memory 114, and based thereon issues a signal on line 126 dictating the direction of corrective action, (i.e. nominally forward or reverse) and via line 127 the nature thereof (i.e. designation of the particular phase to be energized). Thus, based on these signals, together with the digital encoded correction signal at line 123, power drive amplifier 104 switches power to the designated coils, achieving the requisite correction and driving the motor condition toward the constant speed goal.

Referring next to FIG. 2, there is shown in somewhat greater schematic detail a particular realization in the embodiment of FIG. 1. In FIG. 2, the motor amplifier 104, and the motor itself including coils 105, 106, and 107 still form the basis of the operation, with the shaft 102 of the brushless DC motor being monitored by encoder 103, and with nominal down, up, and index signals being conveyed via lines 108, 109, and 111, respectively, to the position counters 112. Position counters 112 accumulate a digital encoded version of the position of the shaft 102, and upon conversion to analog at 115 and signal conditioning at amplifier 117, the analog position signal is conveyed to a comparator 305 for evaluation of the actual error signal, as compared to the reference from the reference profile generator 116.

In FIG. 2, a user panel control 301 is shown providing selection of "freeze frame" via line 302, essentially stopping the motor at a predetermined position (e.g. at the index position), and via lines 303 and 304, respectively, selection of angle and speed to be employed. For example, preferred embodiments include the option of oscillating the shaft 102 through sectors 45° or 90° of angle, and at a speed of 15 or 30 frames per second. It will be appreciated that the angle and speed selections presented via lines 303 and 304 will be varied in accordance with the abilities of those of ordinary skill in the art, depending upon the sort of imaging to be conducted, and the organs or tissues upon which imaging investigation occurs.

The reference profile generator 116 is essentially a charging/discharging circuit, the slope of which is established by the angle and speed selection via lines 303 and 304. Additionally, the PROM memory 114, via Or-gate 319, indicates whether forward or reverse direction is to occur, and accordingly reverses the slope from the reference profile generator back and forth. It is noted that it may be desirable, at each occurrence of a change in slope, to allow a short time delay (i.e. a brief cessation of charge or discharge) to allow control operations to be conducted through other parts of the system, such as at the video memory and display unit, or the like.

The triangular reference is presented to one input of a comparator/amplifier 305, the other input of which, as discussed hereinbefore, is the analog actual position signal from the position counters 112, as converted at digital to analog converter 115. Hence, the output of the comparator/amplifier 305 represents the actual position error of the shaft 102 as compared with the constant speed reference. It will be appreciated that the actual error signal may be positive or negative, depending on the actual divergence displayed. Typically, the output of the amplifier 305 will be a positive voltage when the motor speed is too slow, and a negative voltage when the motor speed is too fast. In the latter instance, when it is desired to slow the motor to the reference, it may be desirable merely to interrupt briefly the motive force to the motor, or actually to reverse the direction of the motor torque for purposes of action as a brake. The breakpoint between these alternative courses of action is established by comparison of the actual error signal from amplifier 305, with a predetermined reference voltage 309 at another comparator/amplifier 308. Hence, in the event that the actual speed is more negative than the desired speed by an amount greater than the threshold dictated by reference voltage 309, switch 306 is operated from its normal position directly connected to the output of amplifier 305, to an alternative position at the output of an inverter 307, thereby providing a positive correction signal to the motor 104. Simultaneously, the indication from amplifier 308 is coupled via Or-gates 317 and 318, and a directional control unit 316, to the motor amplifier 104, effectively changing the direction of the motor, and allowing it to apply braking force to the motor rotor and hence to the shaft 102, until the actual error at the output of amplifier 305 once more is less negative than the reference voltage 309. The analog actual error signal is coupled via switch 306 to a comparator amplifier 311, which combines pulse width modulating signals from 312 to provide a pulse width modulated digital correction signal at line 313 to motor amplifier 104. This completes the basic control loop, in that based on actual position of the shaft 102 and connected rotor, a control signal is derived indicating whether the motor speed should be increased or decreased.

As stated in connection with the embodiment of FIG. 1, the digitized actual position from counters 112 is coupled to a memory 114, shown in the FIG. 2 embodiment as a programmable read only memory (PROM) of common commercial vintage. The PROM 114 maintains in storage various actions to be taken, selectively to energize the phases 105 and/or 106 and/or 107 resulting in peak torque for each direction and position increment of the shaft 102. The PROM 114 couples to the motor winding enable bus 328 a three bit control signal which "tells" the motor amplifier 104 which of the windings 105, 106, or 107 should be energized in order to achieve the correction dictated at enable line 313, in the direction specified on line 314, while achieving peak torque for the present position of the shaft 102. Likewise, the PROM 114 issues directional control signals on lines 329 and 330, via Or-gates 318 and 317, respectively, directional control 316, Or-gate 315, and thence via line 314 to the motor amplifier 104. Finally, the PROM 114 provides, via Or-gate 319, an indication to the reference profile generator 116, based on the actual position at counters 112, of a requisite alteration in the direction of oscillation.

It will be noted from FIG. 2 that the directional steering provided by Or-gates 317 and 318 is based on a variety of options, including the "too fast" braking situation from amplifier 308, and the directional signals from the PROM 114. The logical one on line 332 dictates rotation in one direction, nominally designated forward, and a logical one on line 331 dictates rotation in the contrary direction. Directional control unit 316 is essentially a flip-flop, providing an output state at line 326 dictating the directional control for the motor amplifier 104.

As was previously mentioned in conjunction with the embodiment of FIG. 1, start up conditions dictate somewhat different operation than do free running conditions, and it is necessary to insure that the motor always will start in a given direction, until the index reference is found, and will not stall. The "start" logic 100 of FIG. 1 is embodied in FIG. 2 as an index detection bistable circuit 322, and a series of start up counters 320. As noted in the drawing, the power on reset circuit 370 initially resets the index detection flip-flop, which in turn energizes the start up counters 320. In turn, the PROM 114 is disabled via line 321, and the direction of the motor is conclusively established via line 327, OR-gate 315, and directional control line 314 to amplifier 104. The actual phase selection occurs via bus 325. Hence, during the start up time period, the selection of windings 105, 106, and 107 is dictated by the output of the start up counters 320. It will be appreciated that these sequences will be dictated by the inherent characteristics of the motor being utilized, and that it is well within the ability of those of ordinary skill in the art to fashion a series of counters which produce in sequence on line 325 the requisite sequential identification of phases to be energized for a stall free start up. When the index reference point is sensed, the counters remove the disabling condition from line 321, thereby energizing PROM 114 to assume control of motor winding selection; likewise, a logical zero is coupled to Or-gate 315 via line 327, thereby reinstating directional control to steering gates 317 and 318, and directional control flip-flop 316. Procession of the start up counters 320 through this sequence is energized by a clock signal 323, suitably derived from an appropriate portion of the system.

Referring next to FIG. 3, there is shown a preferred embodiment for an optical encoder 102 to operate in conjunction with the embodiments of FIGS. 1 and 2. As stated, preferred embodiments of the principles of the present invention utilize optical encoders mounted directly on the motor shaft in order continuously to maintain an accurate record of the position of the motor rotor. Although numerous known versions of such encoders are suitable, one which is preferred is that commercially available from Teledyne Gurley, Troy, New York under the designation model 3602-60, Rotary Incremental Encoder. In preferred form, the encoder involves a transparent disc 600 upon which are printed three concentric rings of radial timing marks, individual ones of which are of a thickness, and a radial relationship with the marks of the other rings, to facilitate counting and sensing, and, by comparison of phase, direction of rotation. As is shown in FIG. 3, each such ring has a light source 601, 602, and 603 on one side of the disc 600, and a light detector 604, 605, and 606 on the other, such that the light sources 601 through 603 are alternately exposed to and blocked from the detectors 604 through 607 on the other side. The central ring (i.e. 602–605) has a lesser number of marks per revolution, for example one, indicating a rotational souce or datum index. The other two rings (i.e., 601–604 and 603–606) allow for the actual determination of speed, positioning, and direction of the disc 600. As shown in the drawing, signals from the detector 604, 605, and 606, generally in the form of "squashed" sine waves, are respectively squared off at 607, 608, and 609, and are coupled to an edge detector 611. The signals from the respective signal paths 607 and 609 are out of phase with one another such that as the edge detector 611 generates one pulse for each transition of either square wave from 607 and 609, there is produced a total of four pulses for each full cycle. These pulses, together with the square waves themselves, are coupled to a phase comparator 612, which as shown, produces three types of signals. First, assuming rotation in a given direction, a pulse is generated along the "forward" line 108 for each such transition noted by the edge detector. Assuming rotation in the other direction, a pulse is emitted on the "reverse" line 109. The "index" line 111 signal is derived directly from the central ring detector 605, and indicates passage of the shaft through a datum or index point, such as the central point in the sector of rotation. These signals are coupled to associated counters as disclosed hereinbefore in conjunction with FIGS. 1 and 2.

It will be appreciated from the foregoing discussion that a brushless DC motor is utilized in a fashion which yields a smaller and more reliable scanning head design. Such particular head designs, and video imaging display systems employing servomechanism control, are disclosed in copending applications U.S. Ser. Nos. 178,482 of C. Hottinger entitled "Ultrasound Imaging System Employing Real Time Sector Scanner" (UNI-11) and 178,488 of J. Sorwick entitled "Mechanical Sector Scanner Head and Power Train" (UNI-13). Those disclosures are hereby incorporated by reference herein. In accordance with the principles of the present invention, control difficulties are obviated, and the maximum torque memory scheme permits extremely compact control while avoiding the space limitations to which more traditional methods are subject. Additionally, digital start up and ongoing control procedures insure stable, reliable operation. It will be appreciated that numerous alternative embodiments will occur to those of ordinary skill in the art without departure from the spirit or the scope of the principles of the present invention.

It will be understood that an ultrasound scan element may be attached directly to the shaft 102, or may, as in the referenced copending applications, be eccentrically mounted and coupled to the motor shaft by a belt and pulley system.

I claim:

1. Apparatus for maintaining a substantially constant speed oscillatory motion of an element comprising:
   (a) a brushless DC torque motor for moving said element including amplifier drive means for selectively providing motive power to respective windings of said motor;
   (b) encoder means for developing a signal representative of the actual position of said element;
   (c) first feedback control loop means including
      (i) a source of positional reference signals representative of constant speed oscillatory motion;
      (ii) comparator means for evaluating the difference between said actual position signal and said positional reference signal, and
      (iii) means, responsive to said comparator means for providing speed correctional signals to said amplifier drive means; and
   (d) second feedback control loop means including
      (i) digital memory means, for maintaining a stored representation of the speed-torque-position characteristic of said motor,
      (ii) said memory means including means responsive to said actual position signal for providing torque and phase correctional signals to said drive amplifier means;
   (e) whereby said amplifier drive means operates to reduce said evaluated difference at relatively peak motor torque for said actual position.

2. Apparatus as described in claim 1 wherein said memory means comprises means for storing, for each said actual position, a selection of windings to be energized to achieve peak torque for a given direction.

3. Apparatus as described in claim 2 and further including means for detecting when motor speed is too fast by more than a predetermined amount, and means, responsive to said means for detecting, for selectively slowing said motor speed by applying reverse motor torque.

4. Apparatus as described in claim 3 and further including start up means for temporarily inhibiting said memory means, said means for detecting, and said means for selectively slowing, while establishing a predetermined start up sequence for said motor.

* * * * *